M. C. Bryant.
Machine Gearing.
Nº 6,864.  Patented Nov. 13, 1849.
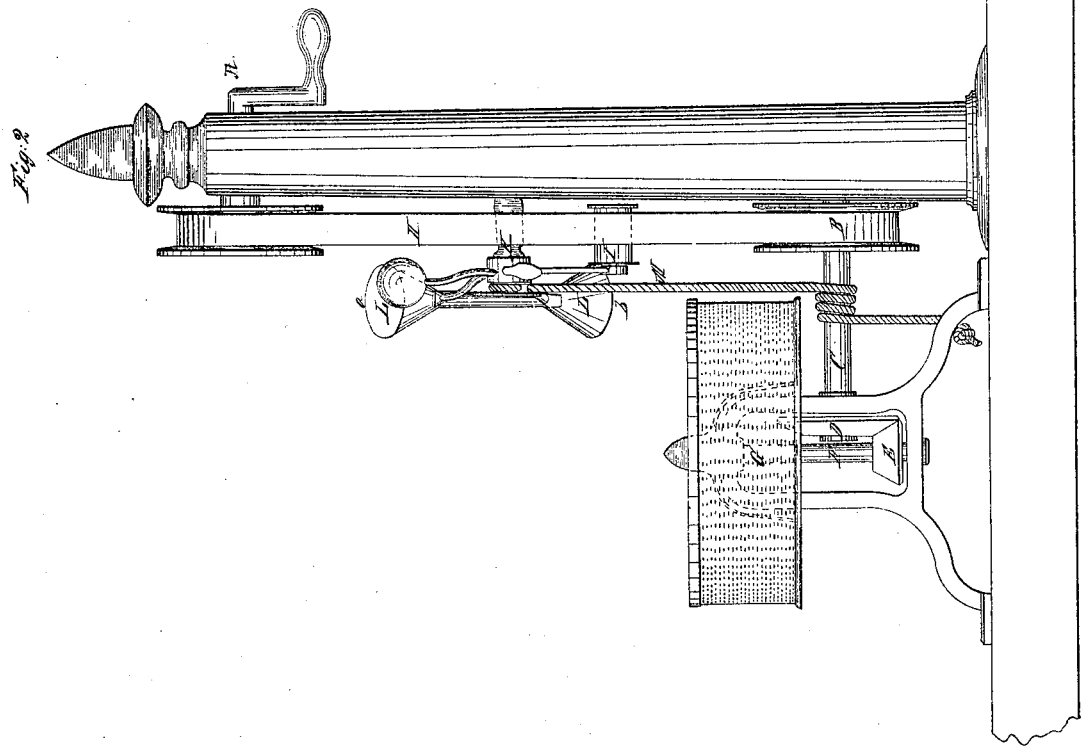
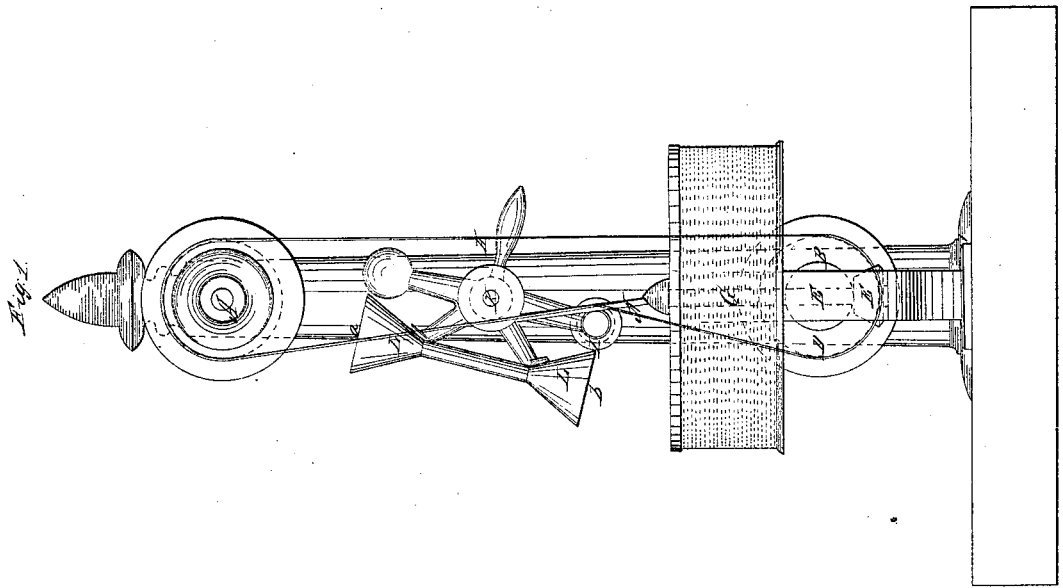

UNITED STATES PATENT OFFICE.

M. C. BRYANT, OF LOWELL, MASSACHUSETTS.

BINDER-PULLEY FOR BELTS AND BRAKES.

Specification of Letters Patent No. 6,864, dated November 13, 1849.

*To all whom it may concern:*

Be it known that I, MERTOUN C. BRYANT, of Lowell, in the county of Middlesex and State of Massachusetts, have invented a new and improved mode of communicating power to machines used for extracting liquors from wool, cloth, and other materials and also an improved method of retarding and stopping the said machines; and I do hereby declare that the following is a full and exact description.

The nature of my inventions may be seen by reference to the accompanying drawings, where—

Figure 1 represents an elevation of the machine looking in the direction of the length of the driving shaft; and Fig. 2 represents an elevation at right angles with Fig. 1.

The corresponding letters upon each figure represents same part.

A is the driving shaft from which the power is to be communicated to the pulley B which is fixed to the shaft C. Upon the shaft C is fixed the bevel D which drives the bevel E which is fixed to the upright shaft F to which is attached the basket G the outer rim of which is pierced with holes so that when the clothes, wool or other material from which the liquid is to be taken is placed in the basket and the basket put in rapid rotation, the liquid by its centrifugal force leaves the other matter and passes out of the holes. It becomes necessary from the extreme rapidity of motion required by the basket that the motion should be given gradually and also that the basket should be gradually retarded in stopping it. The gradual starting of the basket I accomplish by means of the belt H the pulleys A and B the binder pulley I (which is represented in the position it would take when the machine is at full speed). The belt H is made so long that when the binder I does not touch it, it will revolve with the pulley A without driving the pulley B. The binder I is connected to an arm and by the arm to a hub which can rotate upon the stud K; attached to the same hub are the vessels L, L, which contain a shifting weight so that when the end $a$ is uppermost (as is represented) the weight will fall to the end $b$ and by its weight press the binder pulley L against the belt H and thereby bring the belt upon the pulley B and by its friction upon it cause it to revolve and by a proper regulation of the weights the belt will at first slip upon the pulley B, but by its continued friction upon it gradually increase its speed and bring it up to the same proportional speed as its driver A.

The gradual retarding and stopping of the machine I accomplish by means of a friction strap or brake M one end of which is fixed; and then the strap is passed a few times around the shaft C in the direction of its motion and then into the groove upon the rotating hub and then attached to the hub; so that, when the hub is turned in the direction to take the binder pulley from the belt the friction strap will wind upon the hub and thereby tighten the strap upon the shaft C causing friction which will tend to stop the machine.

Having thus fully described my improvements what I claim as my invention and for which I desire to secure Letters Patent is,

1. To communicate power, to machines used for extracting liquids from other matter, by means of a movable binder pulley and a slack belt, binder pulley being pressed upon the belt by means of a shifting weight as herein described.

2. To attach to the same part to which is connected the binder pulley, the friction strap or brake, so that, by the same movement that the binder is taken from the belt, the brake is brought to act upon the machine to stop it by the means herein described.

MERTOUN C. BRYANT.

Witnesses:
ABNER FROST,
LLOYD WELLS NIXON,